(No Model.) 2 Sheets—Sheet 1.
G. H. HOWLAND.
WHEEL MOUNTED MANURE FORK, &c.
No. 285,486. Patented Sept. 25, 1883.
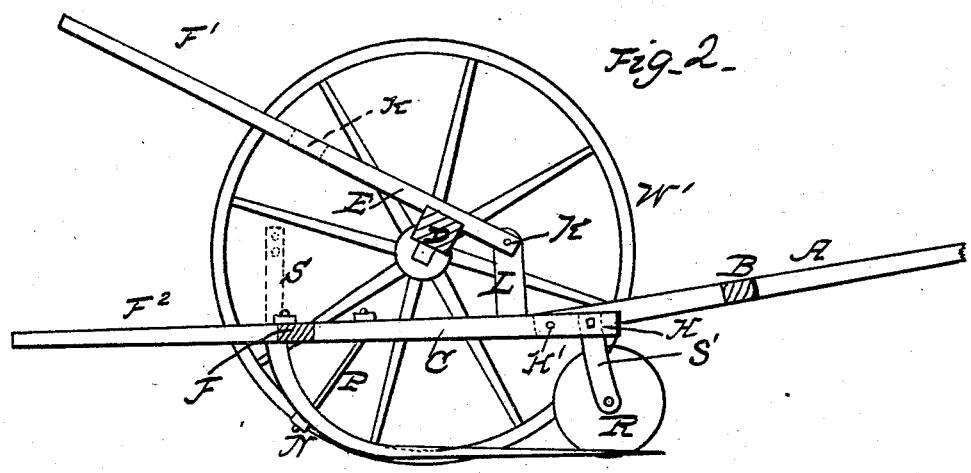
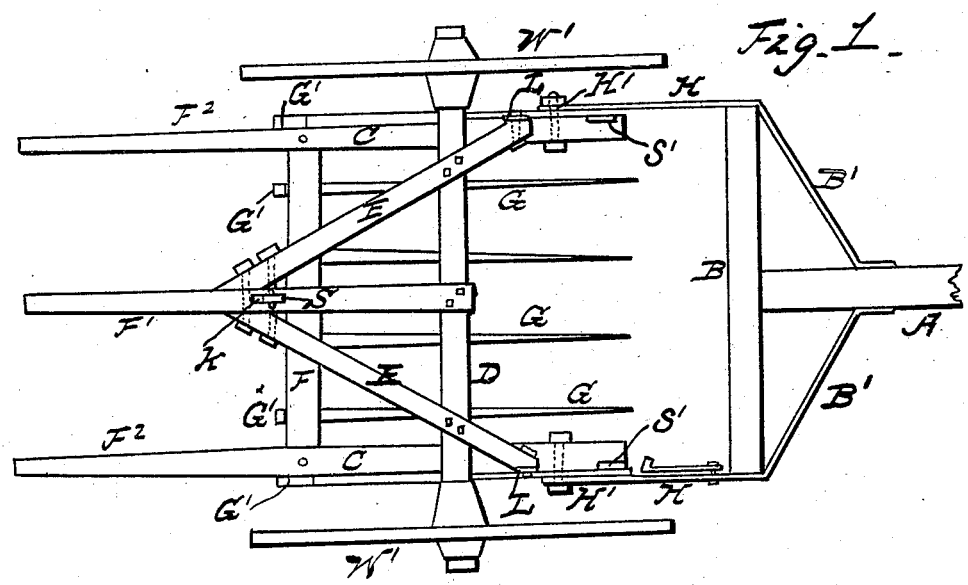
WITNESSES
Wm. N. Bates
John T. Gilder
INVENTOR
G. H. Howland
By Theophilus Weaver his ATTORNEY.
N. PETERS, Photo-Lithographer, Washington, D. C.

(No Model.) 2 Sheets—Sheet 2.
G. H. HOWLAND.
WHEEL MOUNTED MANURE FORK, &c.
No. 285,486. Patented Sept. 25, 1883.
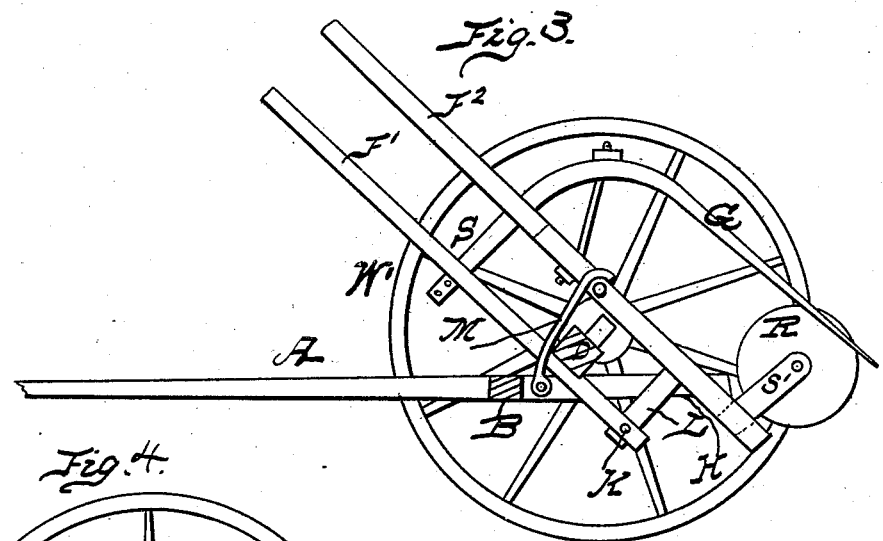
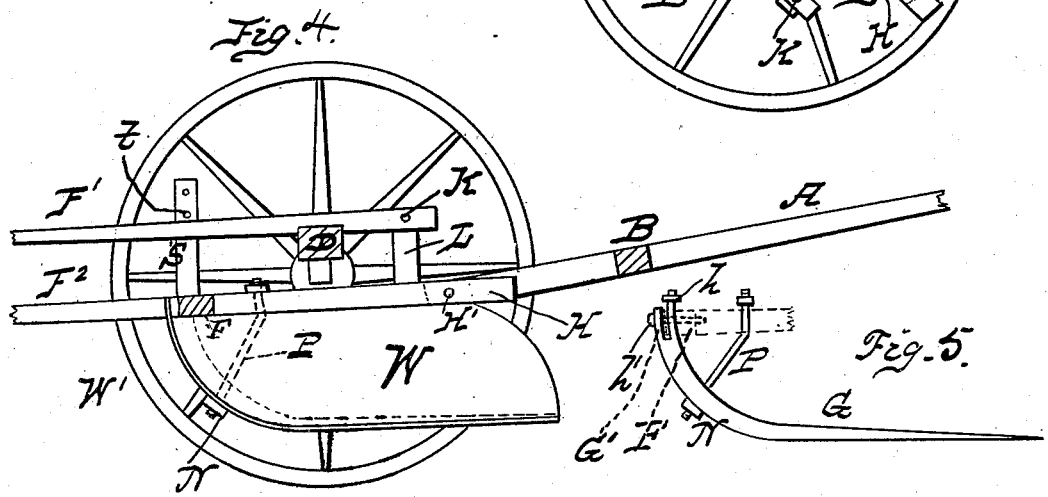
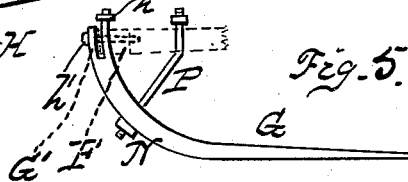
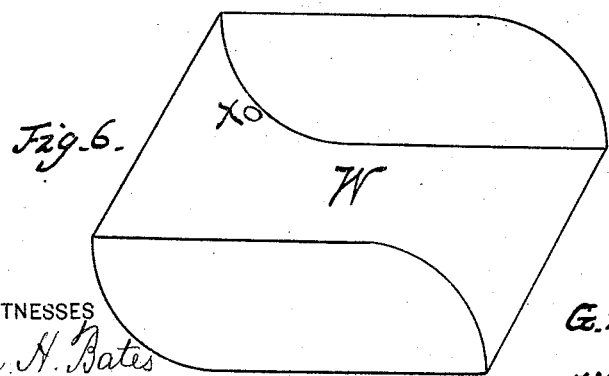
WITNESSES
Wm. H. Bates
John T. Gilder
INVENTOR
G. H. Howland
By Theophilus Weaver his ATTORNEY

United States Patent Office.

GEORGE H. HOWLAND, OF BLUE EARTH CITY, MINNESOTA, ASSIGNOR OF TWO-THIRDS TO FREDERICK L. HOWLAND AND PETER B. DAVY, OF SAME PLACE.

WHEEL-MOUNTED MANURE-FORK, &c.

SPECIFICATION forming part of Letters Patent No. 285,486, dated September 25, 1883.

Application filed March 30, 1882. (No model.)

*To all whom it may concern:*

Be it known that I, GEORGE H. HOWLAND, a citizen of the United States, residing at Blue Earth City, in the county of Faribault and State of Minnesota, have invented a new and useful Wheel-Mounted Manure-Fork and Sod-Stripper, of which the following is a specification.

My invention consists, mainly, in, first, a wheeled conveyance provided with colters or circular cutters, made detachable from the machine, and employed for severing the stratum or bed of manure into sections, in combination with a peculiar runner-form fork arranged horizontally under the carriage-axle, coacting to facilitate loading the same and lifting it to carry free of the ground in driving afield; second, a peculiar truss for staying the fork-tines and the articulation or connection whereby it is adjustable and reversible for unloading; third, the fork in horizontal position for carrying, coupled and held by the handles thereof, in connection with a lever on the axle and a catch therefor, all as more particularly hereinafter pointed out in the claims. I attain the end sought by mechanism illustrated in the accompanying drawings, in which—

Figure 1 is a top view of my invention, representing the apparatus adjusted in position for traveling when it is loaded. Fig. 2 represents a side elevation of the same adjusted in position for loading. Fig. 3 represents a side elevation of the same adjusted for unloading. Fig. 4 represents a side elevation of the same, showing the tines provided with a scoop for taking fine manure, all adjusted in position for traveling. Figs. 5 and 6 represent details, a tine and the scoop, respectively.

Similar letters refer to similar parts throughout the views.

Letter A represents the tongue of the draft-frame; B, the cross-bar framed to its end, and B' denotes the stiffening-stays thereat. H represents extensions of said stays rearward, serving as draft-bars for the vehicle, and they are pivoted at H' to the side pieces, C, of the fork-frame at positions as shown. Said side pieces, C, extend rearward and form the tilting or directing handles $F^2$, and they are connected together about midway by the rear cross-piece, F, of the fork-frame, to which are attached the hilts of the tines G, which are curved and attached as shown in Figs. 5 and 2, the hilt being divided into a tenon, $h$, to be inserted through a mortise in the cross-piece F, and a brace, $h'$, to be fastened to the said cross-piece. The tines G are also braced and joined by the transverse bar N, which latter is secured in place by the truss-rods P at its ends. Said fork-frame C F $F^2$ G N is suspended beneath the carriage-axle D by the standards L on the side pieces, C, the same being coupled by bolts or hinges at K with the extensions of the braces E forward of said axle, which latter serves as the fulcrum of the levers E to raise and lower said fork-frame by operating the handle F'. Said axle D may be bent up at its middle in form of a bell-crank, to give more room under it, and to facilitate tilting the said fork-frame when it is loaded, it being swung into position for unloading, as shown in Fig. 3. A catch, M, holds the parts adjusted or tilted for unloading, that the vehicle may be driven forward and allow the load to drop from the tines G by gravity. Another detent, catch, or standard, S, connects the parts F' and $F^2$, as shown in Fig. 4. Any other equivalent means than the standard S with the pin $t$ may be used for said purpose.

R denotes removable colters for severing the manure in the act of inserting the tines G into it, to prevent irregular dragging of it. After insertion, as set forth, the lever F is depressed, and the loaded fork-frame is thereby raised to bring the load above the ground, the catch S now holding the parts in said position, and stops on the side pieces, C, at the same time limiting the ascent of the draft-bars H above a given point to secure a steady carriage.

For scooping up fine manure, the detritus after forking, or when manure is very mellow, the attachment shown in Fig. 6 is applied to the tines or fork-frame, as shown in Fig. 4. It is simply a scoop made of sheet metal, of suitable shape to conform to the tines G, its open end W taking the place of the points of the tines, as shown, and it being secured to place on the tines in any suitable manner. In the act of scooping, the colters R are removed. The same apparatus with the colters thereon, and without the scoop above mentioned, serves as a sod-stripper when the tines are made broad and are arranged close to each other.

What I desire to secure by Letters Patent is—

1. The wheeled carriage D W' E F', provided with the runner-form carrying-fork G F, extended pronely forward under the axle D, and having guiding-handles at the rear thereof, in combination with the removable severing-colters R, arranged on the beams C, or their equivalents, in line with or fully as advanced as the points of the tines, for severing the portion of the bed of manure taken, and to facilitate lifting the same free of the ground, substantially as set forth.

2. A wheel-mounted fork having long runner-form tines G, attached at their hilts to the cross-head F and stayed by the transverse bar N, and truss-rods P, in combination with the side beams, C, hitching said fork, rigidly joined thereto, with the draft-bars H at the axis H', in front of the line of purchase K of the bifurcated lever E F', to adapt the parts hinged together for reversal for unloading the fork, substantially as set forth.

3. The transporting-fork G F C, mounted on wheels W' by means of beams C, coupled with the lever E F', to lift the loaded fork up to the axle D, while being drawn by the draft appliance A B B' H, in combination with the catch S, substantially as and for the purpose set forth.

In testimony that I claim the foregoing as my invention I have hereunto set my hand and seal, this 25th day of February, A. D. 1882, in presence of two witnesses.

GEORGE H. HOWLAND. [L. S.]

Witnesses:
S. W. GRAHAM,
FRED. H. SMITH.